United States Patent
Inoue (10) Patent No.: US 9,091,361 B2
(45) Date of Patent: Jul. 28, 2015

(54) FLUIDIC DEVICE UNIT STRUCTURE

(75) Inventor: Atsushi Inoue, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 524 days.

(21) Appl. No.: 13/273,461

(22) Filed: Oct. 14, 2011

(65) Prior Publication Data

US 2012/0111423 A1    May 10, 2012

(30) Foreign Application Priority Data

Nov. 5, 2010   (JP) ................................. 2010-248390

(51) Int. Cl.
    *F16L 37/12*     (2006.01)
    *F16K 27/00*    (2006.01)

(52) U.S. Cl.
    CPC ............... *F16K 27/003* (2013.01); *F16K 27/00* (2013.01); *F16L 37/1225* (2013.01); *Y10T 137/6851* (2015.04)

(58) Field of Classification Search
    CPC ..... F16K 27/00; F16K 27/003; F16L 37/1225
    USPC .......... 137/269, 271, 343, 884; 403/376, 377, 403/380
    See application file for complete search history.

(56) References Cited

U.S. PATENT DOCUMENTS

| | | | |
|---|---|---|---|
| 3,560,027 A * | 2/1971 | Graham | 285/130.1 |
| 6,192,938 B1 * | 2/2001 | Redemann et al. | 137/884 |
| 6,546,960 B1 * | 4/2003 | Rohrberg et al. | 137/884 |
| 2002/0017329 A1 * | 2/2002 | Fukushima | 137/884 |
| 2005/0229972 A1 * | 10/2005 | Hoshi et al. | 137/341 |
| 2008/0087346 A1 | 4/2008 | Takada et al. | |

FOREIGN PATENT DOCUMENTS

| | | |
|---|---|---|
| EP | 0 959 280 A1 | 11/1999 |
| JP | 2005-307994 A | 11/2005 |
| JP | 2006-183730 A | 7/2006 |
| JP | 2007-263356 | 11/2007 |
| JP | 2009-097564 A | 5/2009 |

OTHER PUBLICATIONS

Machine translation of JP 2005307994.*
Machine translation of JP 2006-183730.*
European Search Report for European Patent Application No. EP 11008241.9 mailed Feb. 15, 2012 (7 pages).
Office Action issued Apr. 30, 2014 by Japan Patent Office in corresponding Japanese Patent Appln. No. 2010-248390, 2 pages.

* cited by examiner

*Primary Examiner* — Kevin Murphy
(74) *Attorney, Agent, or Firm* — Robert P. Michal; Lucas & Mercanti LLP (57) ABSTRACT

Provided is a fluidic device unit structure in which a plurality of fluidic devices are integrated into a single unit and in which retention of a chemical solution or the like can be prevented. The fluidic device unit structure includes a plurality of fluidic devices connected through a channel; a base member on which the plurality of fluidic devices are integrally disposed; a fastened portion disposed inside the base member; and a fastening member fastened to the fastened portion through at least the fluidic device to thereby hold the fluidic device with the base member.

3 Claims, 7 Drawing Sheets

FLUIDIC DEVICE UNIT STRUCTURE

CROSS REFERENCE TO RELATED APPLICATION

This application claims the benefit under 35 USC 119 of Japanese Patent Application No. 2010-248390 filed Nov. 5, 2010, the entire disclosure of which is incorporated herein by reference.

BACKGROUND OF THE INVENTION

1. Field of the Invention

The present invention relates to a fluidic device unit structure in which fluidic devices, such as valves and pressure switches, are integrated.

This application is based on Japanese Patent Application No. 2010-248390, the contents of which are incorporated herein by reference.

2. Description of Related Art

Conventional apparatuses that handle fluid, such as chemicals, are configured such that various constituent fluidic devices (valves, regulators various sensors, such as pressure sensors, various switches, such as pressure switches, etc) are connected by piping to form a single unit.

For example, in the case where a plurality of chemical fluidic devices are used, as in semiconductor manufacturing equipment, a structure that allows connection of chemical fluidic devices without using pipes has been proposed. Since no piping is needed, the entire system can be reduced in size.

Furthermore, it has been desired in recent years to develop a fluidic device unit structure in which a plurality of fluidic devices are integrated into a single unit for the purpose of, for example, reducing the footprint (projected area in plan view), which is effective in reducing the size of the apparatus because the component mounting space is reduced, reducing the number of leakage points, which is effective in improving the reliability of the apparatus and in simplifying the maintenance, and reducing the dead volume, which allows efficient use of the fluid.

Thus, a fluidic device unit structure in which a plurality of fluidic devices are integrated into a single unit to reduce the footprint has also been proposed (for example, refer to Japanese Unexamined Patent Application, Publication No. 2007-263356).

However, in the invention described in the above Japanese Unexamined Patent Application, Publication No. 2007-263356, since the various fluidic devices are fixed to a base member with bolts that are passed through through-holes formed in the fluidic devices and the base member, a diagonally extending channel is formed inside the fluidic device unit structure because of manufacturing and space limitations. Such a diagonal channel has the problem that a chemical solution flowing therethrough tends to stagnate, resulting in the possibility of causing so-called liquid pooling.

For example, there is the problem that a slurry chemical solution tends to solidify when it stagnates and may solidify in the liquid pooling described above.

BRIEF SUMMARY OF THE INVENTION

The present invention has been made to solve the above problems, and an object thereof is to provide a fluidic device unit structure in which a plurality of fluidic devices are integrated into a single unit and in which retention of a chemical solution or the like can be prevented.

The present invention provides the following solutions to achieve the above object.

A fluidic device unit structure according to the present invention includes a plurality of fluidic devices connected through a channel; a base member on which the plurality of fluidic devices are integrally disposed; a fastened portion disposed inside the base member; and a fastening member fastened to the fastened portion through at least one of the fluidic devices to thereby hold the fluidic device with the base member.

According to the present invention, fixing the fluidic device to the base member using the fastened portion disposed inside the base member increases the flexibility in placement of the channel formed in the fluidic device unit structure, which prevents formation of an inclined channel or the like in which a chemical solution or the like flowing in the channel may stagnate.

In other words, the method for fixing the fluidic device to the base member using the through-holes, which are formed in the fluidic device and the base member, and the bolts passed through the through-holes requires a wide space for the through-holes and the bolts and is subject to severe limitations on the placement position; in contrast, the method for fixing the fluidic device to the base member using the fastened portion simply needs a narrow space for the fastening portion and the fastened portion and has high flexibility in terms of the placement position. This also increases the flexibility in terms of the placement position of a channel that connects the plurality of fluidic devices, which prevents formation of an inclined channel or the like in which the chemical solution or the like, described above, may stagnate.

With the fluidic device unit structure according to the present invention, fixing the fluidic device to the base member using the fastened portion disposed inside the base member increases the flexibility in placement of the channel formed in the fluidic device unit structure, which offers the advantage of preventing retention of a chemical solution or the like in the fluidic device unit structure in which a plurality of fluidic devices are integrated into a single unit.

DETAILED DESCRIPTION OF THE INVENTION

First Embodiment

A fluidic device unit according to a first embodiment of the present invention will be described hereinbelow with reference to FIGS. 1 to 5.

Figure 1:
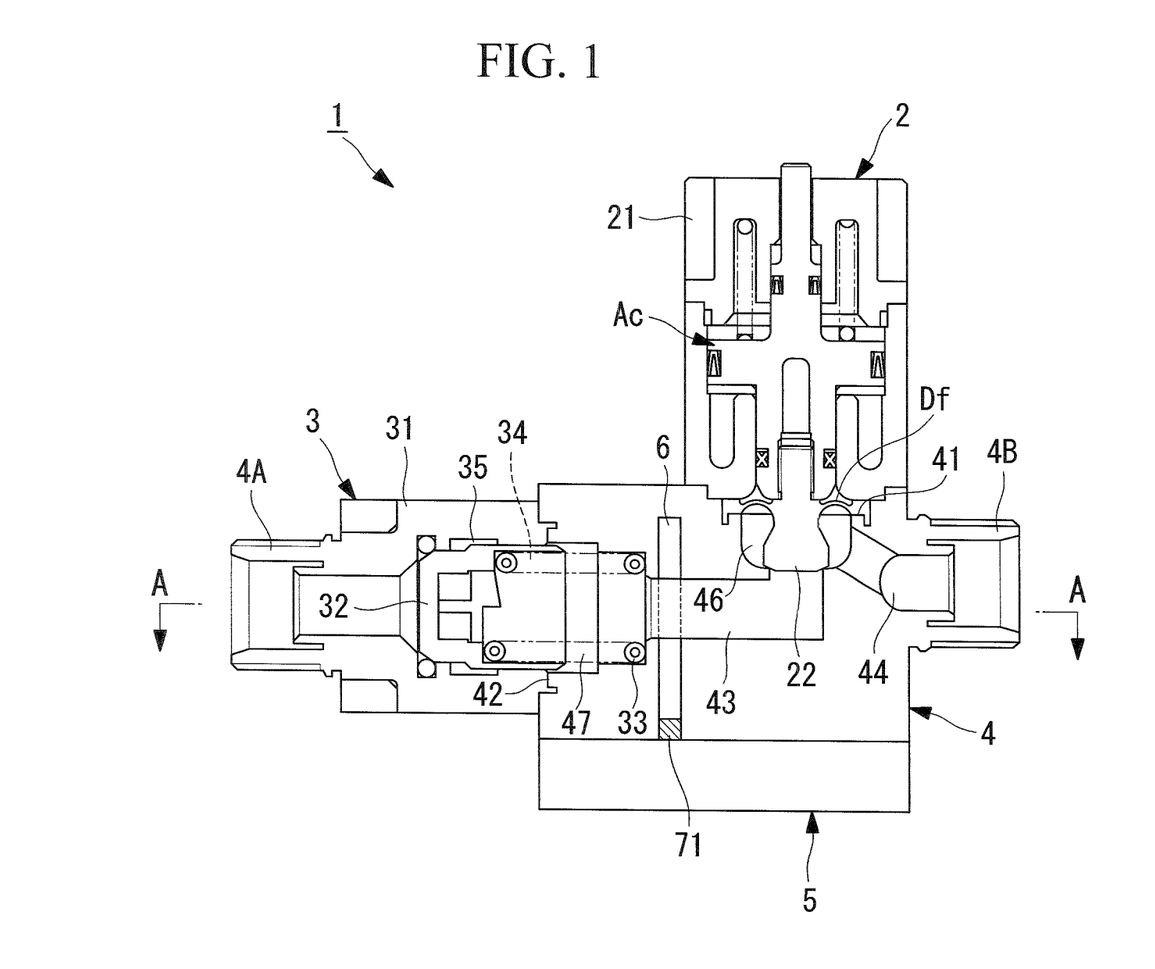
FIG. 1 is a cross-sectional view illustrating, in outline, the configuration of a fluidic device unit according to a first embodiment of the present invention.
Figure 2:
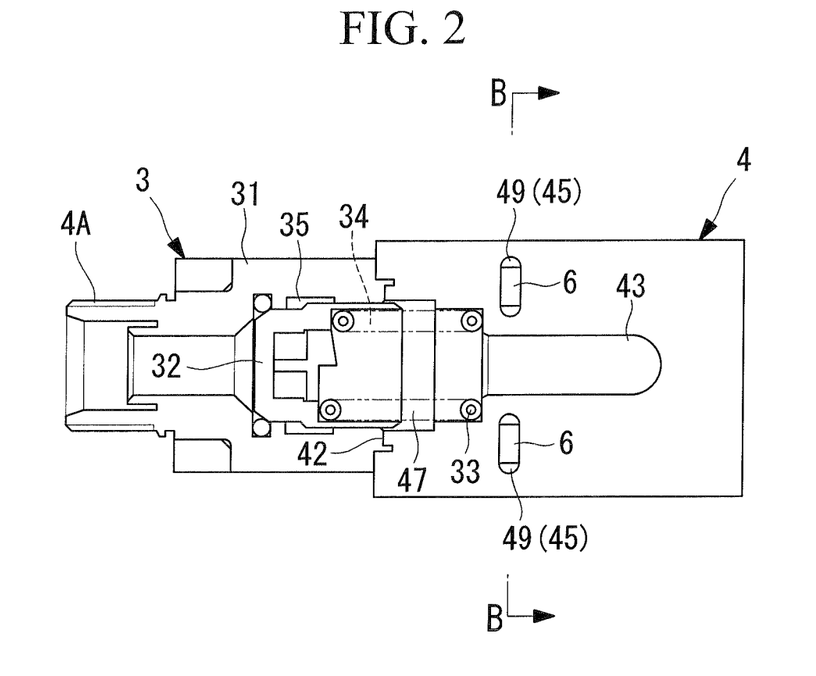
FIG. 2 is a cross-sectional view taken along line A-A illustrating the configuration of the fluidic device unit in FIG. 1.

FIG. 1 is a cross-sectional view illustrating, in outline, the configuration of the fluidic device unit according to this embodiment. FIG. 2 is a cross-sectional view taken along line A-A illustrating the configuration of the fluidic device unit in FIG. 1.

As shown in FIGS. 1 and 2, a fluidic device unit 1 is configured such that a pneumatic control valve (fluidic device) 2 and a check valve (fluidic device) 3 are integrated into a single unit on a base member 4.

Although this embodiment is described as applied to an example in which one pneumatic control valve 2 and one check valve 3 are integrated in the fluidic device unit 1, the number of fluidic devices, such as the pneumatic control valve 2, integrated in the fluidic device unit 1 may be two, as in this embodiment, or more; there is no particular limitation.

This embodiment will be described as applied to an example in which principal parts are formed of a fluoroethylene plastic or the like having chemical resistance.

Figure 4:
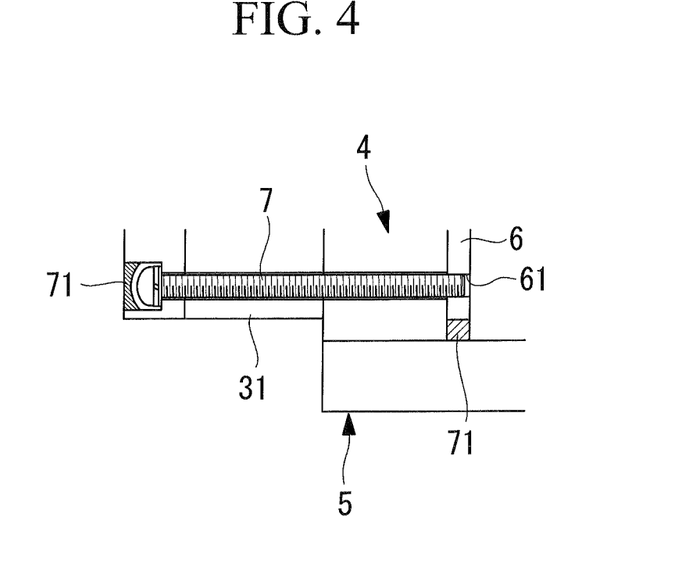
FIG. 4 is a cross-sectional view taken along C-C illustrating the configuration of the plate in FIG. 3 fixed with the bolts to the base member.
Figure 5:
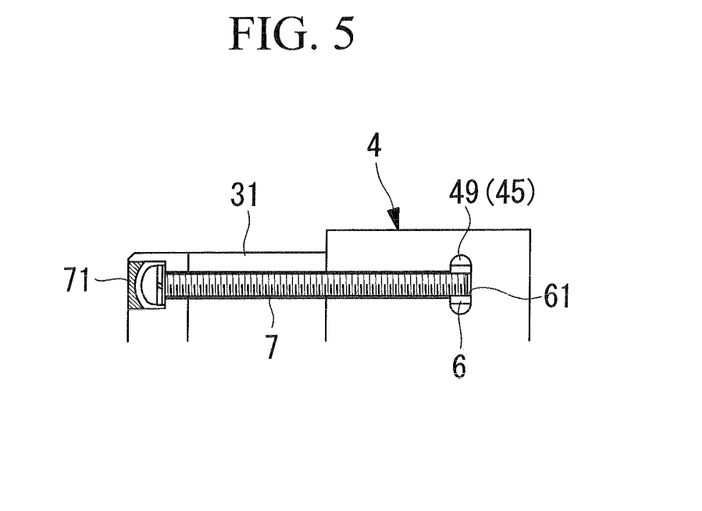
FIG. 5 is a cross-sectional view taken along line D-D illustrating the configuration of the plate in FIG. 3 fixed with the bolts to the base member.

The fluidic device unit 1 is provided with the base member 4 to which the pneumatic control valve 2 and the check valve 3, shown in FIGS. 1 and 2, are fixed; a base 5; the pneumatic control valve 2 that controls the flow of a chemical solution or the like; the check valve 3 that controls the flow of the chemical solution or the like in one direction; a plate (fastened portion) 6 disposed inside the base member 4; and bolts (fastening portions) 7, shown in FIGS. 4 and 5, that fix the check valve 3 to the base member 4 together with the plate 6.

The base member 4, like the base 5, is a member on which the pneumatic control valve 2 and the check valve 3 are integrated and is formed of a fluoroethylene plastic or the like having chemical resistance.

The base member 4 is provided with a first installation surface 41 on which the pneumatic control valve 2 is installed, a second installation surface 42 on which the check valve 3 is installed, a connecting channel (channel) 43 that connects the first installation surface 41 and the second installation surface 42, an outlet channel 44 that connects the first installation surface 41 and an outlet portion 4B, and a placement portion 45 that is a space in which the plate 6 is disposed.

The first installation surface 41 is a portion on which the pneumatic control valve 2 is disposed and controls the passage of a chemical solution or the like through the fluidic device unit 1 together with the pneumatic control valve 2. As shown in FIG. 1, the first installation surface 41 is a low-step installation surface formed by recessing the upper surface of the base member 4 (the upper surface in FIG. 1).

The first installation surface 41 is provided with a cylindrical space 46 in which a valve element 22 of the pneumatic control valve 2 is accommodated. The cylindrical space 46 is connected to the connecting channel 43 from below and is connected to the outlet channel 44 from diagonally below.

The second installation surface 42 is a portion on which the check valve 3 is disposed and controls the direction of the flow of the chemical solution or the like passing through the fluidic device unit 1 in one direction together with the check valve 3. As shown in FIGS. 1 and 2, the second installation surface 42 is a side surface of the base member 4 and is a stepped-down installation surface formed by recessing the surface opposite the surface at which the outlet portion 4B is provided (the left side surface in FIG. 1).

The second installation surface 42 is provided with a cylindrical space 47 in which a valve element 32 of the check valve 3 and springs 33 are accommodated. The connecting channel 43 is connected to the cylindrical space 47 from the first installation surface 41 side.

The connecting channel 43 is a channel that connects the first installation surface 41 and the second installation surface 42 and guides the chemical solution or the like that has passed through the check valve 3 to the pneumatic control valve 2.

The connecting channel 43 is a channel that extends substantially horizontally from the second installation surface 42 towards the first installation surface 41, then turns and extends in a substantially vertical direction below the first installation surface 41.

The outlet channel 44 is a channel that connects the first installation surface 41 and the outlet portion 4B and guides the chemical solution or the like that has passed through the pneumatic control valve 2 to the outlet portion 4B.

Figure 3:
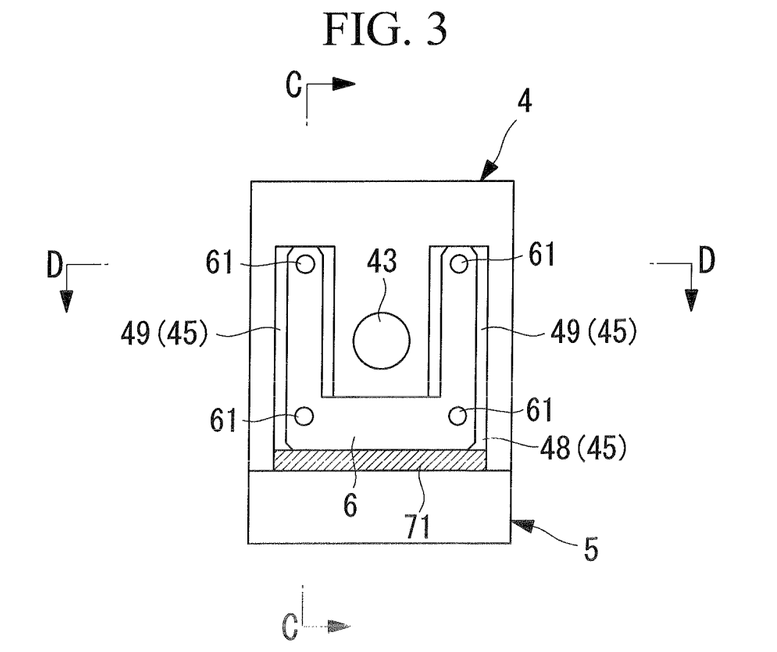
FIG. 3 is a cross-sectional view taken along line B-B illustrating the configuration of a placement portion and a plate in FIGS. 1 and 2.

FIG. 3 is a cross-sectional view taken along line B-B illustrating the configuration of the placement portion 45 and the plate 6 in FIGS. 1 and 2.

The placement portion 45 is a space in which the plate 6 is disposed and which is formed at the center of the base member 4, as shown in FIGS. 1 and 2, more specifically, between the first installation surface 41 and the second installation surface 42 of the base member 4.

The placement portion 45 is open at the surface of the base member 4 facing the base 5 and is constituted in a substantially U-shape by a groove portion 48 extending in the direction perpendicular to the connecting channel 43 and a pair of holes 49 extending from both ends of the groove portion 48 toward the first installation surface 41.

Therefore, when the base 5 is removed from the base member 4, the placement portion 45 becomes a space that opens to the outside, which facilitates placement of the plate 6 in the placement portion 45. On the other hand, when the base 5 is mounted on the base member 4, the placement portion 45 can be a space isolated from the outside. Filling the groove portion 48 with a caulking compound 71 further ensures isolation of the placement portion 45 from the outside. In other words, the plate 6 can be reliably isolated from the outside atmosphere.

An example of the caulking compound 71 is a caulking compound having chemical resistance, such as silicone.

As shown in FIGS. 1 and 2, the base 5 is a member that forms the placement portion 45 inside the base member 4 together with the base member 4. More specifically, the base 5 is a plate-like member mounted to the lower surface of the base member 4 (the lower surface in FIG. 1), which is mounted on the base member 4 to close the opening of the placement portion 45.

As shown in FIG. 1, the pneumatic control valve 2 is mounted on the base member 4 and controls the passage of a chemical solution or the like through the fluidic device unit 1 together with the first installation surface 41.

The pneumatic control valve 2 is provided with a casing 21 that constitutes the outer shape of the pneumatic control valve 2, the valve element 22 that controls the flow of the chemical solution or the like together with the cylindrical space 46, a diaphragm Df, and an actuator Ac.

As shown in FIG. 1, the casing 21 is mounted on the first installation surface 41 and accommodates the actuator Ac.

The valve element 22 is a substantially cylindrical member which is formed of a fluoroethylene plastic or the like having chemical resistance and which is disposed in the cylindrical space 46 to control the flow of the chemical solution or the like flowing from the connecting channel 43 into the outlet channel 44.

The valve element 22 is disposed such that the lower end can come into and out of contact with the opening of the connecting channel 43 to the cylindrical space 46, and the upper end is connected to the actuator Ac.

As shown in FIG. 1, the diaphragm Df is a disc-shaped member formed of a fluoroethylene plastic or the like having chemical resistance and extending from the side of the valve element 22 outward in the radial direction and is disposed between the casing 21 and the first installation surface 41. Disposing the diaphragm Df between the casing 21 and the first installation surface 41 allows the cylindrical space 46 to be isolated (sealed) from the outside and allows the valve element 22 to be moved.

As shown in FIG. 1, the actuator Ac controls the actuation of the valve element 22. By way of example, this embodiment is described as applied to an actuator actuated by receiving a supply of air pressure from the outside.

As shown in FIGS. 1 and 2, the check valve 3 is mounted on the base member 4 and controls the direction of the flow of the chemical solution or the like that passes through the fluidic device unit 1 in one direction together with the second installation surface 42.

The check valve 3 is provided with a casing 31 that constitutes the outer shape of the check valve 3, a valve element 32 that controls the direction of the flow of the chemical solution or the like that passes through the fluidic device unit 1 in one direction together with the second installation surface 42, and the springs 33.

As shown in FIGS. 1 and 2, the casing 31 is a cylindrical member which is formed of a fluoroethylene plastic or the like having chemical resistance, which is mounted on the second installation surface 42, and in which the valve element 32 is accommodated.

The casing 31 is provided with an inlet portion 4A into which the chemical solution or the like flows, a valve-element accommodating portion 34 that communicates with the inlet portion 4A and accommodates the valve element 32, and a fluid outlet 35 that opens at the side surface of the valve-element accommodating portion 34.

As shown in FIGS. 1 and 2, the valve element 32 is a bottomed cylindrical member formed of a fluoroethylene plastic or the like having chemical resistance and disposed in the valve-element accommodating portion 34 and the cylindrical space 47 to control the direction of the flow of the chemical solution or the like passing through the fluidic device unit 1 in one direction.

The valve element 32 is disposed so as to come into and out of contact with the opening of the inlet portion 4A to the valve-element accommodating portion 34 and is urged toward the inlet portion 4A by the springs 33.

As shown in FIGS. 1 and 2, the springs 33 are elastic members that urge the valve element 32 toward the inlet portion 4A. The springs 33 are disposed in a space formed between the interior of the valve element 32 and the cylindrical space 47, one end of which is in contact with an end of the cylindrical space 47, and the other end of which is in contact with an end face inside the valve element 32.

The springs 33 are formed of a material having chemical resistance and elasticity.

As shown in FIGS. 1 to 3, the plate 6 is a plate-like member formed in a substantially U-shape that fixes the check valve 3 to the base member 4 together with the bolts 7. As shown in FIG. 3, the plate 6 has internal threaded portions 61 with which the bolts 7 come into engagement. Although this embodiment is described as applied to an example in which the internal threaded portions 61 are formed at four locations, the number of the internal threaded portions 61 may be either more or less than four; however, it is not particularly limited thereto.

As an example, the plate 6 is made of stainless steel coated with polytetrafluoroethylene (Teflon (registered trademark)); however, it is not particularly limited thereto.

FIG. 4 is a cross-sectional view taken along line C-C illustrating the configuration of the plate 6 in FIG. 3 fixed with the bolts 7 to the base member 4. FIG. 5 is a cross-sectional view taken along line D-D illustrating the configuration of the plate 6 in FIG. 3 fixed with the bolts 7 to the base member 4.

The bolts 7 fix the check valve 3 to the base member 4 together with the plate 6. Specifically, the bolts 7 are passed through through-holes formed in the casing 31 of the check valve 3 and the base member 4 and are brought into engagement with the internal threaded portions 61 of the plate 6 to thereby fix the check valve 3 to the base member 4.

Next, the operation of the above-configured fluidic device unit 1 will be described.

As shown in FIG. 1, the fluidic device unit 1 controls the flow of a chemical solution or the like with the pneumatic control valve 2.

Specifically, when a chemical solution or the like is made to flow, the valve element 22 is actuated upward by the actuator Ac of the pneumatic control valve 2 to make the connecting channel 43 communicate with the cylindrical space 46.

This makes the chemical solution or the like flow through the inlet portion 4A to retract the valve element 32 of the check valve 3 toward the base member 4 and flows into the fluid outlet 35. The chemical solution or the like that has flowed into the fluid outlet 35 flows through the connecting channel 43, the cylindrical space 46 in the pneumatic control valve 2, and the outlet channel 44 in this order via the valve-element accommodating portion 34 and the cylindrical space 47 and flows out of the fluidic device unit 1 through the outlet portion 4B.

On the other hand, when the flow of the chemical solution or the like is to be shut off, the valve element 22 is actuated downward by the actuator Ac, so that the connecting channel 43 and the cylindrical space 46 are shut off from each other. This shuts off the flow of the chemical solution or the like from the inlet portion 4A to the outlet portion 4B.

Next, a method for manufacturing the fluidic device unit 1, which is the feature of this embodiment, will be described.

When the fluidic device unit 1 is to be manufactured, first, the base member 4, the pneumatic control valve 2, the check valve 3 and so on are separately manufactured, and then, the pneumatic control valve 2, the check valve 3 and so on are mounted on the base member 4.

When the check valve 3 is to be mounted on the base member 4, the plate 6 is inserted into the placement portion 45 of the base member 4, and the check valve 3 is disposed on the second installation surface 42, as shown in FIGS. 1 to 3.

Although this embodiment is described as applied to an example in which the plate 6 is inserted upward from the lower surface of the base member 4, the plate 6 may be inserted downward from above or may be laterally inserted; however, it is not particularly limited thereto.

Thereafter, as shown in FIGS. 4 and 5, the bolts 7 are passed through the through-holes of the casing 31 of the check valve 3 and the base member 4, and the ends of the bolts 7 are brought into engagement with the internal threaded portions 61 of the plate 6. Tightening the bolts 7 ensures that the check valve 3 is fixed to the base member 4.

The opening of the placement portion 45 (see FIG. 3) and the through-holes of the casing 31 through which the bolts 7 are passed (see FIGS. 4 and 5) are filled with the caulking compound 71. Furthermore, the base 5 is mounted on the lower surface of the base member 4.

Since a method for mounting the pneumatic control valve 2 onto the base member 4 is the same as a conventional mounting method, a description thereof will be omitted.

With the above configuration, fixing the check valve 3 to the base member 4 using the plate 6 disposed inside the base member 4 increases the flexibility in placement of the connecting channel 43 and so on formed in the fluidic device unit 1, which prevents formation of an inclined channel or the like in which the chemical solution or the like flowing therein may stagnate. This can therefore prevent retention of a chemical solution or the like in the fluidic device unit 1 in which a plurality of fluidic devices are integrated into a single unit.

In other words, the method for fixing the check valve 3 to the base member 4 using the through-holes formed in the check valve 3 and the base member 4 and the bolts 7 passed through the through-holes requires a wide space for the through-holes and the bolts 7 and is subject to severe limitations on the placement position; in contrast, the method for fixing the check valve 3 to the base member 4 using the plate 6 simply needs a narrow space for the bolts 7 and the plate 6 and has high flexibility in terms of the placement position. This also increases the flexibility in terms of the placement position of a channel that connects the plurality of fluidic devices, such as the check valve 3, which prevents formation of an inclined channel or the like in which the chemical solution or the like, described above, may stagnate.

Second Embodiment

Next, a second embodiment of the present invention will be described with reference to FIGS. 6 and 7.

Although the basic configuration of the fluidic device unit of this embodiment is similar to that of the first embodiment, the placement positions of the pneumatic control valve and the check valve differ from the first embodiment. Thus, the configuration around the check valve will be described in this embodiment using FIGS. 6 and 7, and descriptions of the other components and so on will be omitted.

Figure 6:
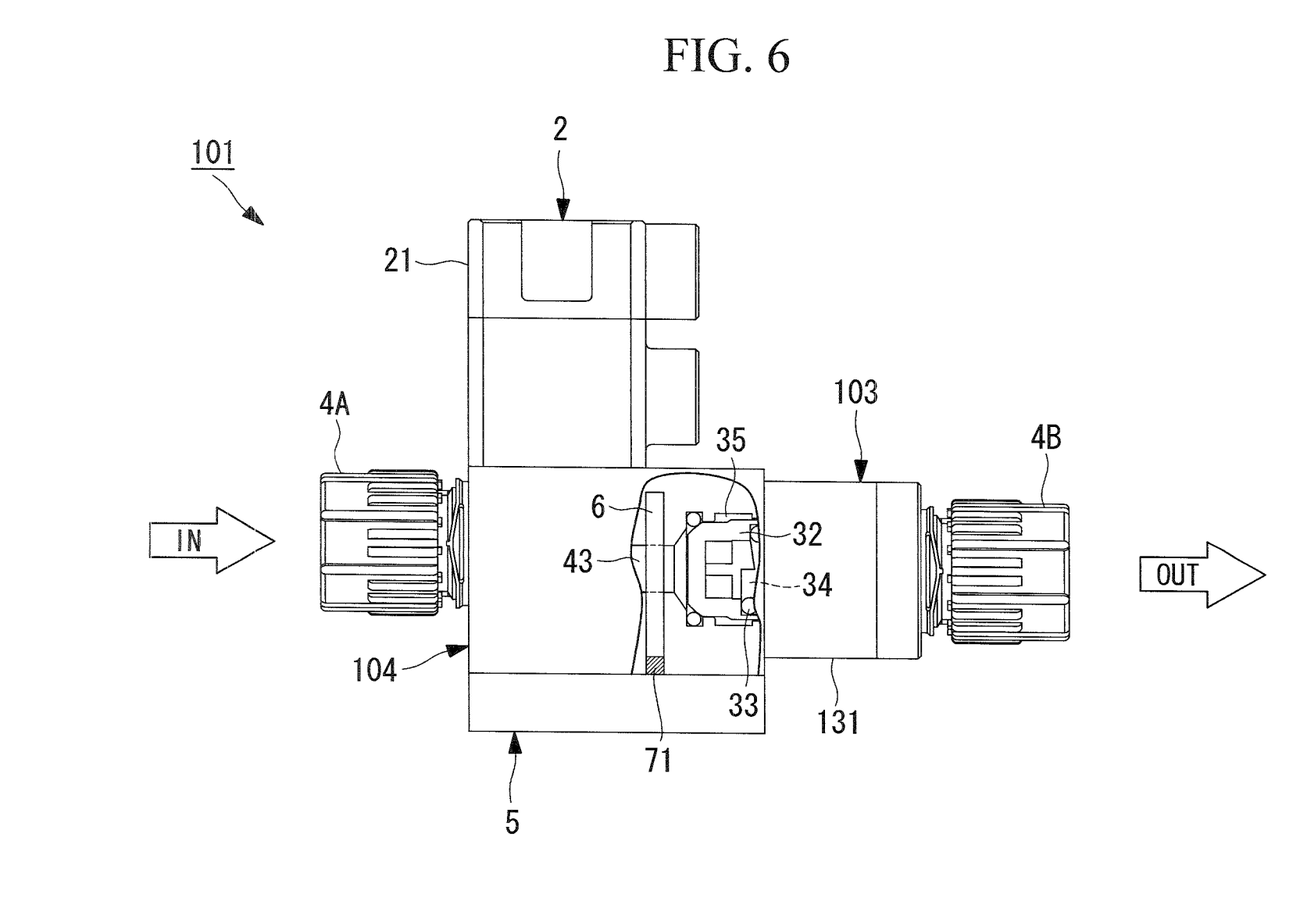
FIG. 6 is a side view illustrating the overall configuration of a fluidic device unit according to a second embodiment of the present invention.

FIG. 6 is a side view illustrating the overall configuration of the fluidic device unit according to this embodiment. FIG. 7 is a top view illustrating the configuration of the fluidic device unit in FIG. 6.

Components that are the same as those in the first embodiment are given the same reference signs, and descriptions thereof will be omitted.

Figure 7:
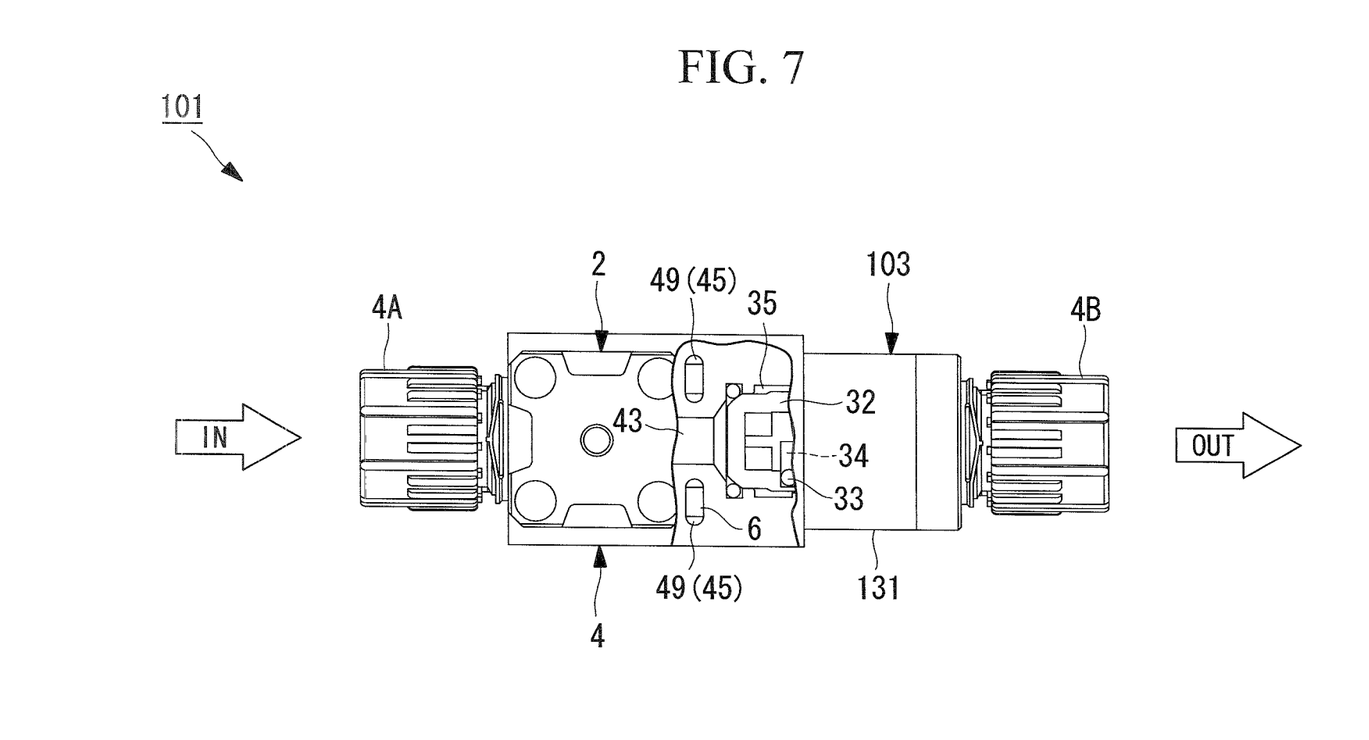
FIG. 7 is a top view illustrating the configuration of the fluidic device unit in FIG. 6.

As shown in FIGS. 6 and 7, a fluidic device unit 101 of this embodiment is configured such that the pneumatic control valve 2 is disposed on the upstream side of the base member 104 into which a chemical solution or the like flows, and the check valve 103 is disposed on the downstream side to which the chemical solution or the like flows out, and they are integrated into a single unit.

The base member 104 is provided with the connecting channel 43, which connects the pneumatic control valve 2 and the check valve 103, the placement portion 45, which is the space in which the plate 6 is disposed, the valve-element accommodating portion 34 in which the valve element 32 of the check valve 103 is accommodated, and the fluid outlet 35, which opens at the side surface of the valve-element accommodating portion 34.

The check valve 103 is provided with a casing 131 that constitutes the outer shape of the check valve 103, the valve element 32 that controls the direction of the flow of the chemical solution or the like that passes through the fluidic device unit 1 in one direction, and the springs 33.

As shown in FIGS. 6 and 7, the casing 131 is a cylindrical member formed of a fluoroethylene plastic or the like having chemical resistance, in which the valve element 32 is accommodated.

The casing 131 is provided with the outlet portion 4B through which the chemical solution or the like flows out and the valve-element accommodating portion 34 that communicates with the outlet portion 4B and accommodates the valve element 32.

Next, a method for manufacturing the fluidic device unit 101, which is the feature of this embodiment, will be described.

When the fluidic device unit 101 is to be manufactured, the base member 104, the pneumatic control valve 2, the check valve 103 and so on are separately manufactured, as in the first embodiment, and then, the pneumatic control valve 2, the check valve 103 and so on are mounted on the base member 104.

When the check valve 103 is to be mounted on the base member 4, the plate 6 is inserted into the placement portion 45 of the base member 104, and the check valve 103 is disposed on the base member 104, as shown in FIGS. 6 and 7.

Specifically, the valve element 32 of the check valve 103 is accommodated in the valve-element accommodating portion 34 of the base member 104, and the springs 33 are disposed between the valve element 32 and the casing 131. Thereafter, the bolts 7 are brought into engagement with the plate 6 (see FIGS. 4 and 5), so that the casing 131 is fixed to the base member 104.

With the above configuration, even with the configuration in which the check valve 103 is disposed at the outlet of the chemical solution or the like, as in the fluidic device unit 101 of this embodiment, the check valve 103 can be mounted on the base member 104 using the plate 6. This therefore increases the flexibility in placement of the connecting channel 43 and so on formed inside the fluidic device unit 101, and thus, retention of the chemical solution or the like can be prevented in the fluidic device unit 101 in which a plurality of fluidic devices are integrated into a single unit.

Third Embodiment

Next, a third embodiment of the present invention will be described with reference to FIGS. 8 and 9.

Although the basic configuration of the fluidic device unit of this embodiment is similar to that of the first embodiment, it differs from the first embodiment with regard to the number of integrated pneumatic control valves and the fact that a pressure sensor is provided. Thus, only the configuration around the pneumatic control valves and the pressure sensor will be described in this embodiment using FIGS. 8 and 9, and descriptions of the other components and so on will be omitted.

Figure 8:
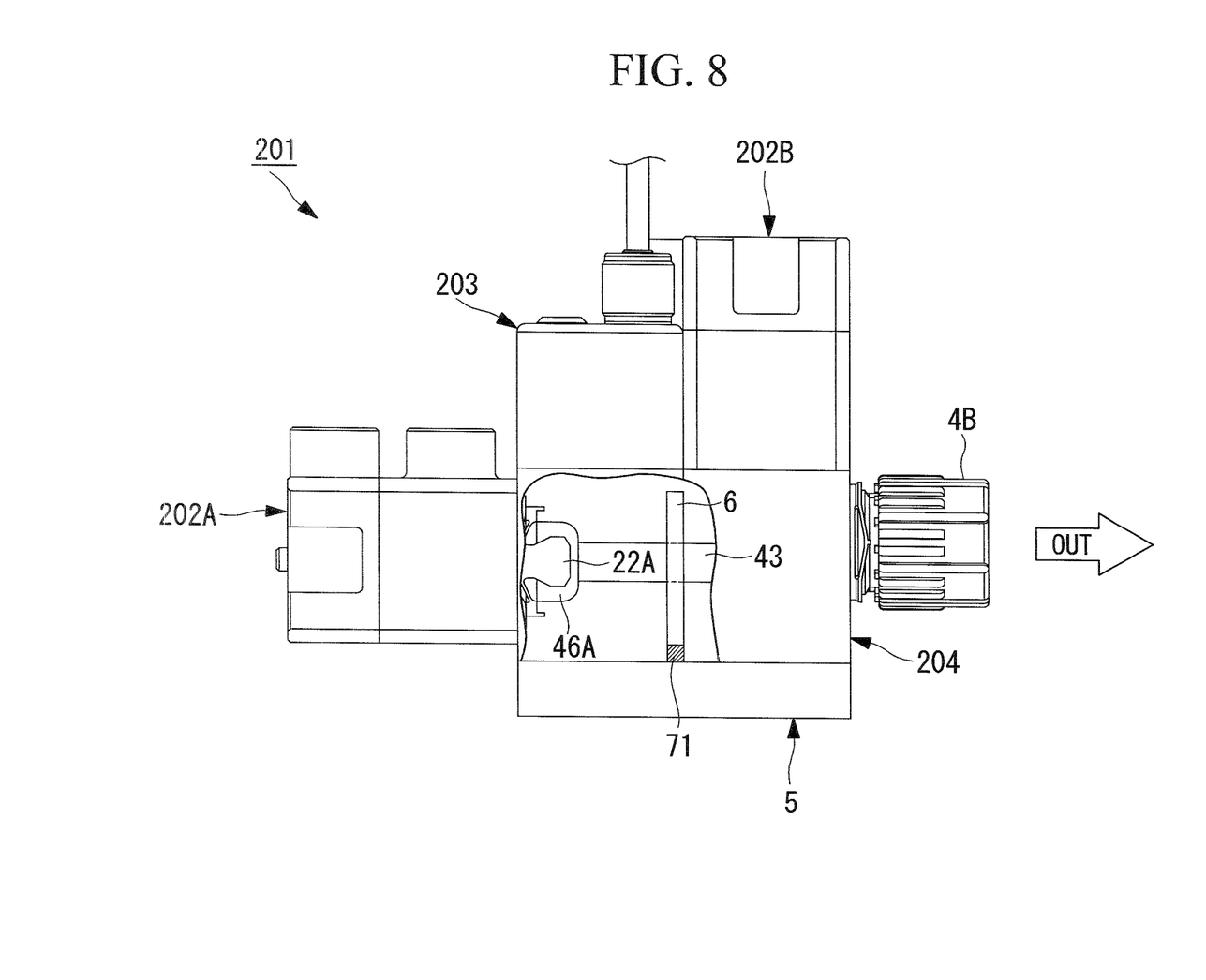
FIG. 8 is a side view illustrating the overall configuration of a fluidic device unit according to a third embodiment of the present invention.

FIG. 8 is a side view illustrating the overall configuration of the fluidic device unit according to this embodiment. FIG. 9 is a top view illustrating the configuration of the fluidic device unit in FIG. 8.

Components that are the same as those in the first embodiment are given the same reference signs, and descriptions thereof will be omitted.

Figure 9:
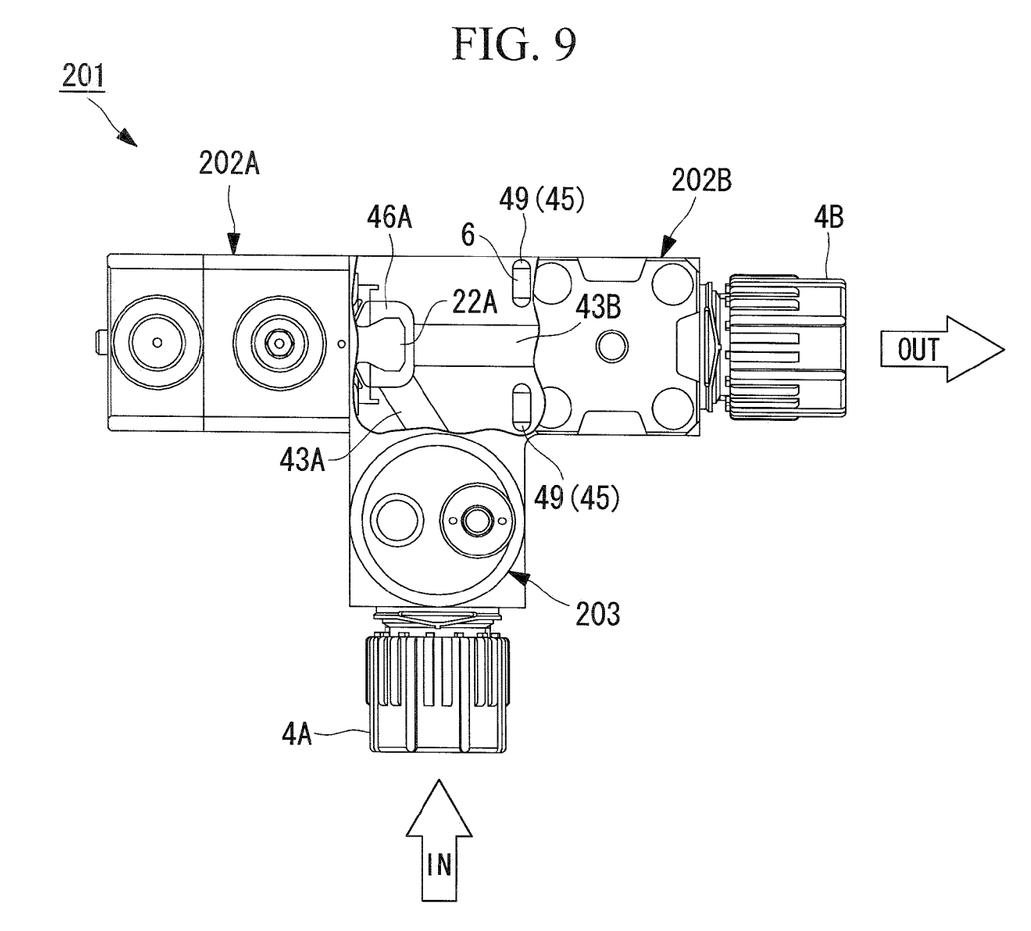
FIG. 9 is a top view illustrating the configuration of the fluidic device unit in FIG. 8.

As shown in FIGS. 8 and 9, a fluidic device unit 201 of this embodiment is configured such that a pressure sensor (fluidic device) 203 for measuring the pressure of a chemical solution or the like is disposed upstream of the base member 204 into which a chemical solution or the like flows, and a pneumatic control valve (fluidic device) 202A and a pneumatic control valve (fluidic device) 202B are disposed downstream of the pressure sensor 203, and they are integrated into a single unit.

The base member 204 is a substantially L-shaped member having the inlet portion 4A at one end and the outlet portion 4B at the other end.

The pressure sensor 203 is mounted on the upper surface of one end of the base member 204 (the upper surface in FIG. 8), and the pneumatic control valve 202B is mounted on the upper surface of the other end. The pneumatic control valve 202A is mounted on the side of the base member 204 between the pressure sensor 203 and the pneumatic control valve 202B (the left side in FIG. 8).

Inside the base member 204, there is a connecting channel 43A that connects the pressure sensor 203 and the pneumatic control valve 202A, a connecting channel 43B that connects the pneumatic control valve 202A and the pneumatic control valve 202B, the placement portion 45, which is the space in which the plate 6 is disposed, a cylindrical space 46A in which a valve element 22A of the pneumatic control valve 202A is accommodated, and a cylindrical space (not shown) in which a valve element (not shown) of the pneumatic control valve 202B is accommodated.

As shown in FIGS. 8 and 9, the placement portion 45 is a space formed in the base member 204 between the pneumatic control valve 202A and the pneumatic control valve 202B.

The pressure sensor 203 is a sensor for measuring the pressure of a chemical solution or the like flowing into the fluidic device unit 201, which may be a known sensor.

Next, a method for manufacturing the fluidic device unit 201, which is the feature of this embodiment, will be described.

When the fluidic device unit 201 is to be manufactured, the base member 204, the pneumatic control valves 202A and 202B, the pressure sensor 203 and so on are separately manufactured, and the pneumatic control, valves 202A and 202B, the pressure sensor 203 and so on are mounted on the base member 204, as in the first embodiment.

When the pneumatic control valve 202B is to be mounted on the base member 204, the plate 6 is inserted into the placement portion 45 of the base member 204, and the pneumatic control valve 202B is disposed on the base member 204, as shown in FIGS. 8 and 9.

Specifically, the bolts 7 are brought into engagement with the plate 6 (see FIGS. 4 and 5) so that the pneumatic control valve 202B is fixed to the base member 204.

With the above configuration, even if the pneumatic control valve 202A is disposed between the pressure sensor 203 and the pneumatic control valve 202B as in the fluidic device unit 201 of this embodiment, the pneumatic control valve 202A can be mounted on the base member 204 using the plate 6. This therefore increases the flexibility in placement of the connecting channel 43 and so on formed inside the fluidic device unit 201, and thus, retention of the chemical solution or the like can be prevented in the fluidic device unit 201 in which a plurality of fluidic devices are integrated into a single unit.

The technical scope of the present invention is not limited to the above-described embodiments, and various modifications may be made without departing from the spirit of the present invention.

What is claimed is:

1. A fluidic device unit structure comprising:
   a plurality of fluidic devices connected through a channel;
   a base member having a base surface upon which the plurality of fluidic devices are integrally disposed;
   a fastened portion which comprises a substantially U-shaped unitary-body plate-like member having first and second legs, the fastened portion being disposed inside the base member;
   a fastening member fastened to the fastened portion through at least one of the fluidic devices to thereby hold the fluidic device with the base member; and
   a placement portion that is formed at the center of the base member and in which the fastened portion is disposed,
   wherein the fastened portion is inserted in one direction parallel to the base surface of the base member, the first and second legs of the fastened portion extending substantially more than halfway through the base member in the one direction, and
   wherein the fastened portion disposed in the placement portion is substantially isolated from the outside atmosphere.

2. The fluidic device unit structure as defined by claim 1 wherein the fastened portion comprises internal threaded portions.

3. The fluidic device unit structure as defined by claim 1 wherein the first and second legs of the U-shaped unitary body are substantially equal in length.

* * * * *